United States Patent

Inoue et al.

[15] 3,699,415
[45] Oct. 17, 1972

[54] CONSTANT SPEED DRIVE UNITS FOR DRIVING DEVICES

[72] Inventors: Yutaka Inoue; Tadao Hotta; Toshihiko Ito, all of Nagoya, Japan

[73] Assignee: Aichi Clock and Electric Implement Mfg., Co., Ltd., Nagoya-shi, Japan

[22] Filed: Aug. 26, 1970

[21] Appl. No.: 67,019

[30] Foreign Application Priority Data

Sept. 10, 1969 Japan.....................44/71788

[52] U.S. Cl..................................318/128, 318/138
[51] Int. Cl............................................G05b 11/02
[58] Field of Search.............318/128, 129, 132, 138; 331/116 M

[56] References Cited

UNITED STATES PATENTS 3,118,098  1/1964  Reich.....................318/132 X
3,375,423  3/1968  Mayer et al................318/138
3,454,856  7/1969  Jones..........................318/138
3,457,483  7/1969  Reifman et al.........318/132 X Primary Examiner—J. D. Miller
Assistant Examiner—Robert J. Hickey
Attorney—Ernest G. Montague

[57] ABSTRACT

The present invention relates a constant speed device for driving means using a transistor switching effect adapted to an apparatus to obtain an uniform rate of rotation or amplitude for electric motors and electromechanical oscillators which can be sufficiently used for timepieces and instruments, and in which a relatively moving member driven by electrical means is provided, and a control member connected to the junction of a diode and a condenser.

10 Claims, 16 Drawing Figures

PATENTED OCT 17 1972 3,699,415

VOLTAGE GENERATED BY
CONTROL VOLTAGE GENERATING ELEMENT
(a) TIME
CONDENSER VOLTAGE
(b) TIME
VOLTAGE APPLIED ON
CONTROLLING MEANS
(c) TIME

INVENTORS
BY

PATENTED OCT 17 1972

INVENTORS
*Tutala Inone*
*Tadan Hotta*
*Toshihiko Ito*
BY
*Ernest F. Montague*
*Attorney*

3,699,415

CONSTANT SPEED DRIVE UNITS FOR DRIVING DEVICES

The present invention relates to constant speed drive units for driving devices.

According to the prior art arrangements, as an example for an apparatus driving a balance wheel, when the voltage produced by the relative movement is inherently small and there is no sufficient space to increase windings of the control voltage generating element, it is very difficult to obtain, when the relative speed exceeds a predetermined value, a voltage which is sufficiently higher than the threshold value of the control transistor 6 or diode 6'.

It is therefore the general object of the present invention to provide a simple mechanism which can overcome the aforementioned difficulties.

In this invention, a drive apparatus comprises a switching transistor, a control transistor, control element, a control voltage generating element, a control means such as control transistor or control diode, and a diode inserted between a condenser and an input side of the control transistor or the control diode in such a direction that the current flows opposite to the control means looking from the condenser. A charging element connected in series with a condenser and a diode to form a closed circuit and further disposed so as to be able to make a relative movement with respect to a movable body is separately provided, or alternatively, another portion of the circuit such as a generating element or a driving element may be utilized to serve a function of the charging element. The charging element is so arranged to determine its direction that an electric power in the direction opposite to the diode is produced in the charging element when an electric power in the direction to operate the switching transistor is produced in the generating element but, an electric power in the forward direction of the diode is produced in the charging element when an electric power in the direction opposite to the direction to operate the switching transistor is produced in the generating element. A voltage charged into a condenser by a charging element through a diode and a voltage produced by a generating element are totalized and applied onto a control element, by which sufficiently large voltage applied to a control transistor to obtain satisfactory controlling function is provided even in a small size driving apparatus.

A resistor is connected to a closed circuit consisting of a charging element, a diode and a condenser for the purpose of temperature compensation.

A generating element serving as a control voltage generating element or a charging element, resulting a simplified mechanism can be provided.

A driving element serving as a charging element, resulting in a simplified mechanism can be provided.

By using a control transistor as a control means, one of an output side of a control transistor can be connected to a connecting point of a battery and a driving element so as to sufficiently operate an apparatus under relatively high temperature.

With these and other objects in view, the invention will be understood in connection with the drawings of which:

Figure 4:
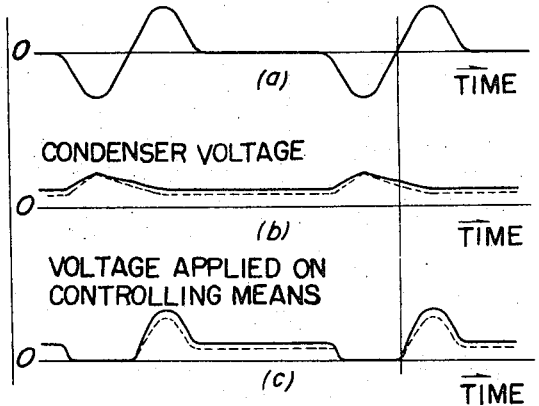

FIG. 4(a), (b) and (c) show voltage changes in various parts of the present invention and in the FIG. (a) shows a voltage generated by a control voltage generating element, (b) a terminal voltage of a condenser 10 and (c) an input voltage applied in the forward direction to a control means;

FIG. 5–15 show circuit diagrams of embodiments of the present invention; and

Figure 16:
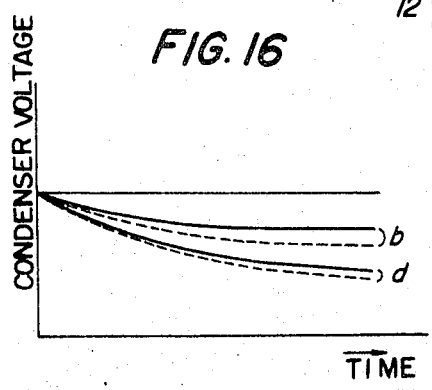

FIG. 16 shows condenser voltage changes.

Figure 1:
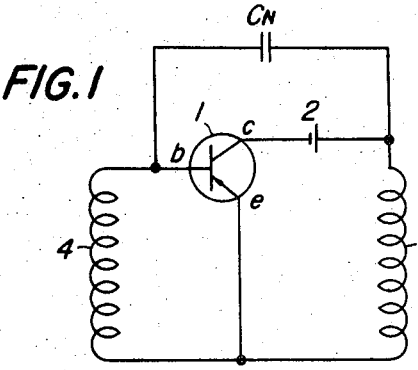
FIG. 1 is a circuit diagram of a drive means in which a constant speed device is not provided.

A drive means is shown in FIG. 1, which comprises a DC power source 2 and a driving element 3 provided in an output circuit of a switching transistor 1, a generating element 4 provided in an input circuit thereof, and a moveable body (not shown) which is movable relative to a drive element 3 and the generating element 4, whereby a voltage is induced due to the relative movement between the movable body and the generating element 4 and applied to the input side of the switching transistor 1 so that a current is allowed to flow toward the output side or the driving element 3 until the voltage at the input side exceeds a threshold voltage to produce driving force between the driving element 3 and the movable body in such a direction that accelerates the relative movement. There have been disadvantages in that the relative speed may vary due to the changes in the power source voltage and that, when the device is used in a balance wheel, the amplitude thereof may vary resulting in variation of the period.

In order to eliminate these disadvantages and to perform a constant speed drive, there has been conceived a constant speed device comprising a control voltage generating element for generating a voltage proportional to the relative movement of the movable body, and a control means which is connected to the base b of the switching transistor 1 and also the control voltage generating element so as to receive the voltage therefor, to reduce the input into the base b of the switching transistor by producing a control current when the applied voltage is above the threshold voltage. An impedance may further be provided at a portion which is common to both the input circuit of the switching transistor 1 and the control circuit of the control means and in which current flows in the same direction.

Figure 2:
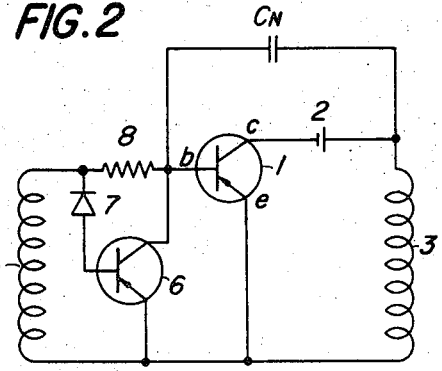
FIG. 2 and 3 show circuit diagrams of two different types of drive means having constant speed devices of prior art.

For example, as shown in FIG. 2, a control transistor 6 is additionally provided as a control means and connected at one of its output sides to the base $b$ of the switching transistor in such a direction that the current flows in the same direction at the point of connection. The other of the output sides of the control transistor 6 is so connected in the circuit with the emitter $e$ of the switching transistor 1 that, a voltage is also applied to the output side of the control transistor 6 in the direction of the current, and a voltage generated by the generating element 4 is applied to the input side of the control transistor 6 through a diode 7. A resistor 8 operating as the aforementioned impedance is provided at a portion which is outside of the input circuit of the control transistor 6 but common to both the output circuit of the control transistor 6 and the input circuit of the switching transistor 1 and in which currents from the two circuits flow in the same direction. Thus, when the relative speed exceeds a predetermined value, the input side of the control transistor 6 is subjected to a voltage exceeding the threshold voltage, so that a current appears in the output side of the transistor 6 resulting in an increase in the voltage drop at the resistor 8. As a result, the voltage at the input side of the switching transistor 1 is reduced below the threshold voltage and thus the driving force of the driving element 3 is also reduced. Thus, the relative speed is decreased until a predetermined value is retained. In this example, the generating element 4 is utilized as a control voltage generating element to operate the control means when the relative speed exceeds a predetermined value; thus a control voltage generating element is not required to be provided separately from the generating element 4.

Figure 3:
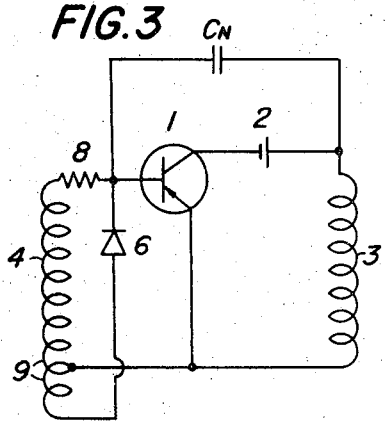

In the example shown in FIG. 3, the control means comprises a control diode 6' having one terminal connected with the base b of the switching transistor 1 in such a manner that the current flows in the same direction at the point of connection. Further, there is also provided a coil 9' which produces a voltage proportional to the relative speed and which is connected with the generating element 4 and the other terminal of the diode 6' is connected to the coil 9', in such a manner that, when a voltage is applied to the input side of the switching transistor 1 in the direction of the current therein due to the existence of the voltage generated by the generating element 4, the control diode 6' is also subjected to the total voltage produced by the generating element 4 and the coil 9 and applied in the forward direction. A resistor 8 is provided at a portion which is common to both the circuit for applying voltage to the control diode 6' and the input circuit of the switching transistor 1 and in which currents from the two circuits flow in the same direction. With this arrangement, a similar effect can be obtained as in the arrangement shown in FIG. 2. In this case, the generating element 4 and the coil 9 which are connected in series serve as a control voltage generating element.

Reference is now made to the description of the present invention.

Figure 5:
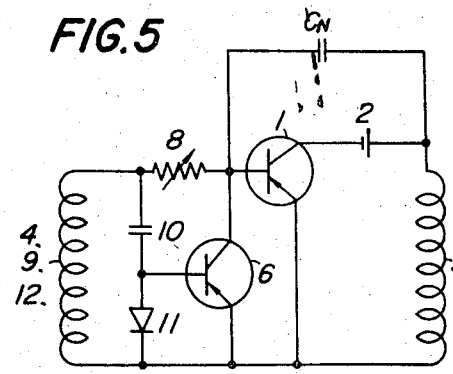

In the example shown in FIG. 5, both ends of a generating element 4 are connected with both ends of a condenser 10 and a diode 11 which are connected in series, and a connecting point between the condenser 10 and the diode 11 is connected to a base b of a control transistor 6. A voltage generated in a generating element 4 by means of relative motion of a relatively moving member has a wave shown in FIG. 4(a), and a switching transistor 1 operates when the voltage flows in the forward direction of the input side of the switching transistor 1 but, the switching transistor 1 is inoperative when the voltage flows in the contrary direction. When a switching transistor 1 is inoperative, a terminal voltage in a generating element 4 is plus at a connecting point between the generating element 4 and a resistor 8 but, minus at a connecting point between the generating element 4 and a diode 11 by means of the voltage produced in the generating element 4. Thus, at this time, a charging current flows into a condenser 10 through the diode 11 by means of a voltage produced in the generating element 4, and the condenser 10 is charged in such manner that terminal of said condenser is plus at the terminal to be connected to the generating element 4 and, minus at the terminal to be connected to the diode 11. When a switching transistor 1 is inoperative, because of plus potential at a terminal connected to the diode 11 and emitter e among terminals of the generating element 4 by means of a voltage produced in the generating element 4, a current has a tendency to flow into the condenser 10 from an emitter e of the control transistor 6 through a base b thereof by means of a voltage produced in the generating element 4, and an electromotive force, at this time, to make flowing base e current of the control transistor 6 is the total of the voltage previously charged into the condenser 10 as above and the voltage produced in the generating element 4, which is approximate two times larger value than the voltage produced in the generating element 4. The total value of the voltages in the condenser 10 and the generating element 4 is approximately proportional to the relative speed, and the total voltage exceeds a threshold voltage of the control transistor 6 when the relative speed exceeds the predetermined value, as a result the control transistor 6 operates and the output current thereof, i.e., the control current flows into a resistor 8. Then an input to the switching transistor 1 is reduced. A driving current flowing into a driving element 3, therefore, is reduced, thereby the relative speed of the movable body is adjusted not to exceed a predetermined value. When a relative speed is lower than a predetermined value, the aforementioned total voltage does not reach a threshold voltage of the control transistor 6, by which the base b current of the control transistor 6 scarcely flows; accordingly the movably body is accelerated after the base b current of the switching transistor 1 flows sufficiently. In the example shown in FIG. 5, a control transistor 6 is used as a control means, a charging element to charge a condenser 10 and a control voltage generating element to operate a control element are not particularly provided, but a generating element 4 serves as a charging element and a control voltage generating element, by which a mechanism of an apparatus is remarkably simplified.

Figure 12:
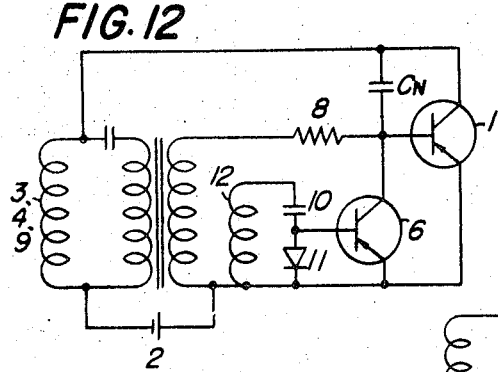

In the example shown in FIG. 12, a driving element 3 is not particularly provided, but an example in which the present invention is actualized in a driving apparatus of a prior art in such way that a generating element 4 serves as the driving element, and a voltage induced in the generating element 4 is applied to a switching transistor 1 through a coupling condenser 16 and an input transformer 17. In this example, a control voltage generating element is prepared by a coil 9 which is wound separately, and this coil 9 serves as a function of a charging element. All CN marks in the referenced drawings represent a neutral condenser.

In the examples as the abovementioned, both cases such that a control voltage generating element and a charging element are appropriately provided and the other, they are served by a generating element etc without appropriately providing as the former are illustrated. In this invention, to sum up, comprising a condenser 10 which is inserted into an input circuit of a control means and charging current in the direction opposite to a current flow when a current in the forward direction is applied to said control means after applying a voltage changed by responding with change of relative speed of a movable body, and a diode 11 provided at a portion which is included in a circuit in which the aforementioned charging current is passed through but excluded in an input circuit to the control means in such direction that a current in the direction opposite to said charging current is blocked.

Generally speaking, in this invention, a condenser 10 is charged by a charging element, and the electricity is discharged through a control voltage generating element, thus, the sum of the voltage generated by the control voltage generating element which is applied to a control means and the voltage from the condenser 10 is increased in substantial proportion to the relative speed. Therefore, the control voltage generating element can be of small capacity so that the aforementioned difficulties can be eliminated.

When the voltage produced by the control voltage generating element changes as shown in FIG. 4(a), the terminal voltage of the condenser 10 changes as shown in FIG. 4(b), so that the voltage applied to the control means in the forward direction, which is the sum of the positive components of (a) and (b), changes as shown in FIG. 4(c).

In each of the examples shown in FIGS. 5–15 except FIG. 12, a generating element 4 is utilized as a control voltage generating element. In the examples shown in FIGS. 5, 6, 7, 8, 9, 10, 13, 14 and 15 (namely except those shown in FIGS. 11 and 12), the generating element 4 also serves as a charging element. Further, in the examples shown in FIGS. 8 and 10, a driving element 3 also partially serves as the charging element. Thus, these arrangements are advantageous in that they are simple and compact in structure.

Figure 11:
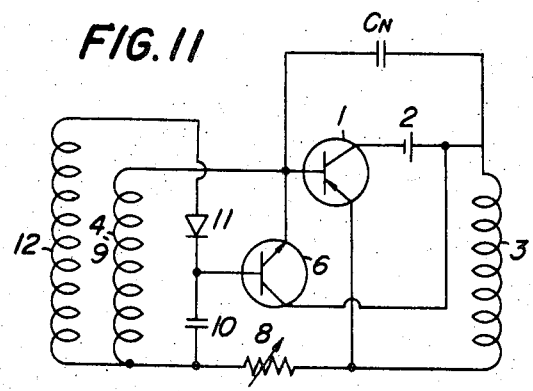

In the examples shown in FIG. 11, a charging element is separately provided and shown as a coil 12.

Figure 6:
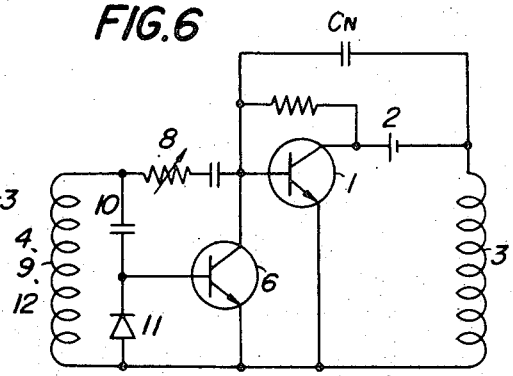
Figure 7:
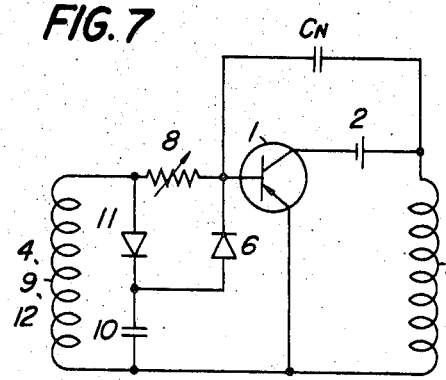
Figure 8:
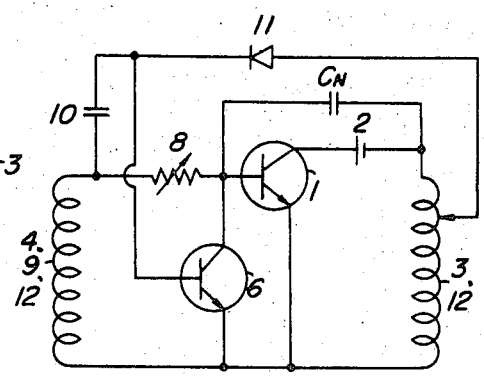
Figure 9:
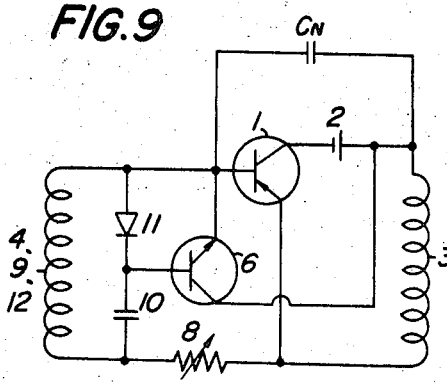
Figure 10:
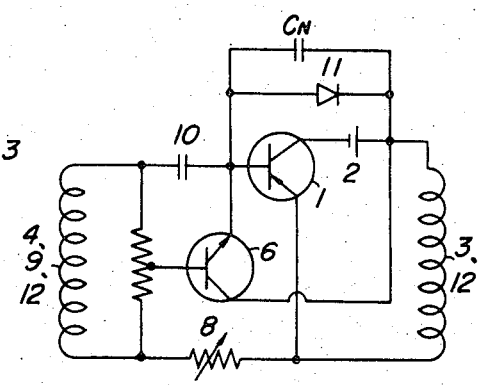

In the example shown in FIG. 6, the numeral 14 is a bias resistor. The aforementioned impedance consists of a resistor 8 and a coupling condenser 8'. Further, a condenser 10 shown in FIG. 10 also serves as a function of a coupling condenser. The numeral 15 is a potentiometer inserted between a generating element 4 and a control element 6.

Figure 13:
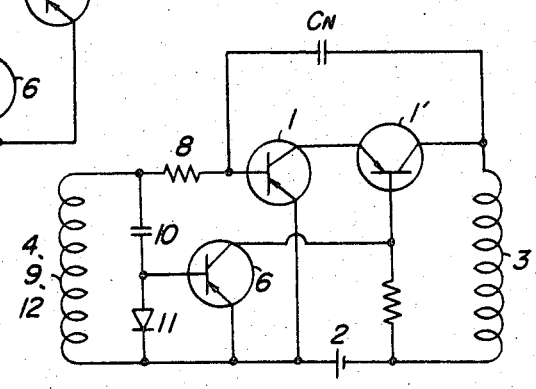

In the example of FIG. 13, the output is amplified in two stages by two switching transistors 1' and 1. Further, in the example shown in FIG. 7, a diode 6' is used as the control element. In the other examples, a transistor 6 is used as the control element.

In the examples shown in FIGS. 9, 10, 11 and 15, the output side of a control transistor 6 is connected between a battery 2 and a driving element 3 so that the voltage of the battery 2 is added to the voltage applied to said output side. This is advantageous in that it is effective to reduce the change of amplification degree of the control transistor 6 due to temperature change.

In the examples shown in FIGS. 5–13, a relative movement is returned to its original value when the sum of the voltage $e_1$ induced in a control voltage generating element and a terminal voltage Vc of a condenser 10 exceeds the threshold voltage of the control element. In these arrangements, since current is allowed to leak through a diode 11 etc. and the like during slight times from the time when the condenser 10 is charged to the time when it discharges to actuate the control means, the terminal voltage of the condenser 10 is gradually reduced as shown by a solid line in FIG. 4(b). On the other hand, the leak resistance R of the diode 11 decreases as the temperature increases and thus the leak current increases as the temperature increases, so that the terminal voltage of the condenser 10 changes as shown by a broken line in FIG. 4(b). Therefore, the input voltage of the control means changes as shown by the broken line in FIG. 4(c) with the result that the time interval in which the input voltage of the control means is around the threshold voltage thereof can be reduced. This is effective to reduce the time interval during which the driving force of the driving element is reduced due to the decrease in the output current of the switching transistor 1. Thus, the relative speed is increased until the driving force is balanced with load. The balanced relative speed increases with the increase of temperature. In other words, although the relative speed can be maintained constant irrespective of the supply voltage or load, it changes in response to the change in temperature.

Figure 14:
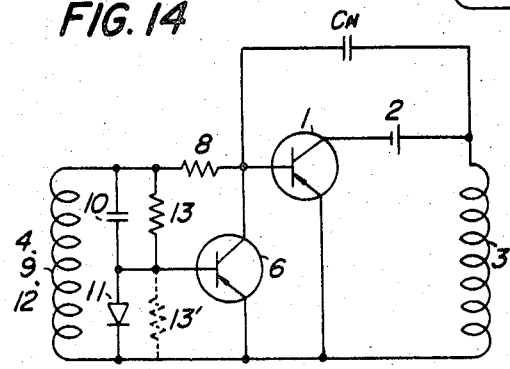
Figure 15:
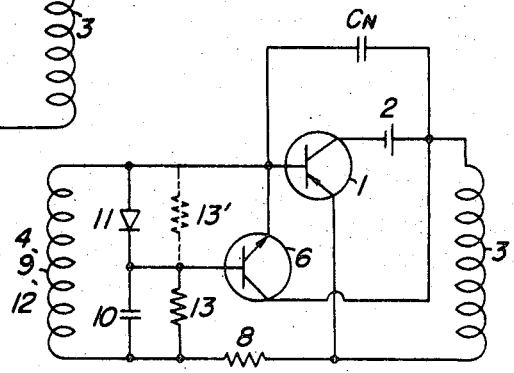

In order to avoid this disadvantage, in accordance with the examples shown in FIGS. 14 and 15, a temperature compensating resistor 13 or 13' is connected in the closed circuit including a condenser 10. A resistor is connected at one end between a diode 11 and the condenser 10 and at the other end to the other portion of the closed circuit and has a resistance value $r$ relatively small as compared with the leak resistance R of the diode 11. When an analysis is made by neglecting the resistance of the charging element and the leak of the control means, the resistance against the leak of the condenser 10 will be R when the temperature compensating resistor 13 or 13' is not provided, and $(1)/(1/R + 1/r) = (Rr)/(R + r)$ when the resistor 13 or 13' is provided. Thus, when the temperature compensating resistor is provided, there is no remarkable change in the value $(Rr)/(R + r)$ even when the value R changes due to the temperature variation. Where the value $r$ is sufficiently small with respect to the value $R$, then the value $(Rr)/(R + r)$ becomes nearly equal to $r$ so that the value does not substantially change in response to temperature change. The terminal voltage of the condenser 10 is shown in FIGS. 16(b) and (d) with respect to the arrangements one of which does not include but other of which includes the temperature compensating resistor 13 or 13'. The broken line shows the changes under an increased temperature. In this instance, the temperature compensating resistor 13 or 13' serves to slightly discharge the condenser 10. If the voltage of the condenser 10 is low as shown by the curve d the voltage applied from the charging element to the control means is low as compared with the threshold voltage of the control means. Therefore, the output current of the switching transistor 1 is not controlled and the relative speed is increased until it stabilizes at a suitable speed. Thus, the resistance of the resistor 8 may be increased or the voltage generated by the charging element at a given relative speed may be increased so that the stabilized speed is selected as the predetermined speed.

According to the present invention, it is possible to obtain a constant speed even in a small drive means in which a voltage generated by a control voltage generating element is inherently small. Further, since the device of the present invention is less sensitive to temperature variation, it facilitates the manufacture of small constant speed motors or small oscillatory member.

We claim:

1. A speed fixing circuit, comprising
a voltage generating means for producing voltage by relative motion of a moving member with respect thereto,
driving means including a switching transistor adapted to receive as an input a voltage from said voltage generating means induced by a relative motion with respect thereto of said moving member and discharging an output for accelerating said relative motion,
a control voltage increasing means connected to said voltage generating means for receiving an input voltage from said voltage generating means,
a controlling means connected to said control voltage increasing means for receiving as an input thereto a voltage changed in response to a velocity change of the relative motion of said moving member,
said controlling means being connected to said switching transistor for discharging an output current decreasing an input voltage to said switching transistor only when an input voltage thereto in one direction exceeds the threshold voltage of said controlling means and passing very little current when an input voltage is applied thereto in the other direction,
said control voltage increasing means comprises,
a capacitor connected to an input portion of said controlling means and to said voltage generating means and receiving voltage changing in response to a change of velocity of the relative motion of said moving member, so as to permit to pass therethrough a charging current in a direction opposite to a current direction when a forward input voltage is applied to said controlling means,
a diode connected to a side of said capacitor remote from said voltage generating means and disposed in a portion of said control voltage increasing means in the path of said charging current and arranged in the latter portion excluded from said input portion of said controlling means, and oriented in a direction so as to block current in a direction reverse to that of said charging current, and
said controlling means having said input portion connected to a point between said capacitor and said diode.

2. The circuit, as set forth in claim 1, further comprising
a temperature compensating resistor having a resistance relatively low with respect to the leakage resistance of said diode is connected across two parts which are conductive to respective terminals of said capacitor in a circuit passing said charging current.

3. The circuit, as set forth in claim 1, wherein said controlling means comprises a diode.

4. The circuit, as set forth in claim 1, wherein said controlling means comprises a second transistor.

5. The circuit, as set forth in claim 4, wherein
said voltage generating means serves as a control voltage generating element for said controlling means,
said voltage generating means further serves as a charging element for charging said capacitor.

6. The circuit, as set forth in claim 4, wherein
said driving means includes an element for driving said moving member connected between said switching transistor and said voltage generating means,
a power source connected between said driving element and an output of said switching transistor,
one of the outputs of said second transistor is connected to the base of said switching transistor, and
the other of the outputs of said second transistor is connnected to a point between said power source and said driving element.

7. The circuit, as set forth in claim 6, wherein
said voltage generating means serves as a control voltage generating element for said controlling means,
said voltage generating means further serves as a charging element for charging said capacitor.

8. The circuit, as set forth in claim 1, wherein
said voltage generating means serves as a control voltage generating element for said controlling means.

9. The circuit, as set forth in claim 8, wherein
said voltage generating means further serves as a charging element for charging said capacitor.

10. The circuit, as set forth in claim 1, wherein
said driving means includes a driving element connected to an output of said switching transistor for receiving said output from said switching transistor for accelerating said relative motion of said moving member, and
said voltage generating means and said driving element are connected and constitute a charging means for charging said capacitor.

* * * * *